May 24, 1955
J. M. WALTER
2,708,861
REVOLVING TABLE FOR MACHINE TOOLS
Filed Oct. 6, 1949
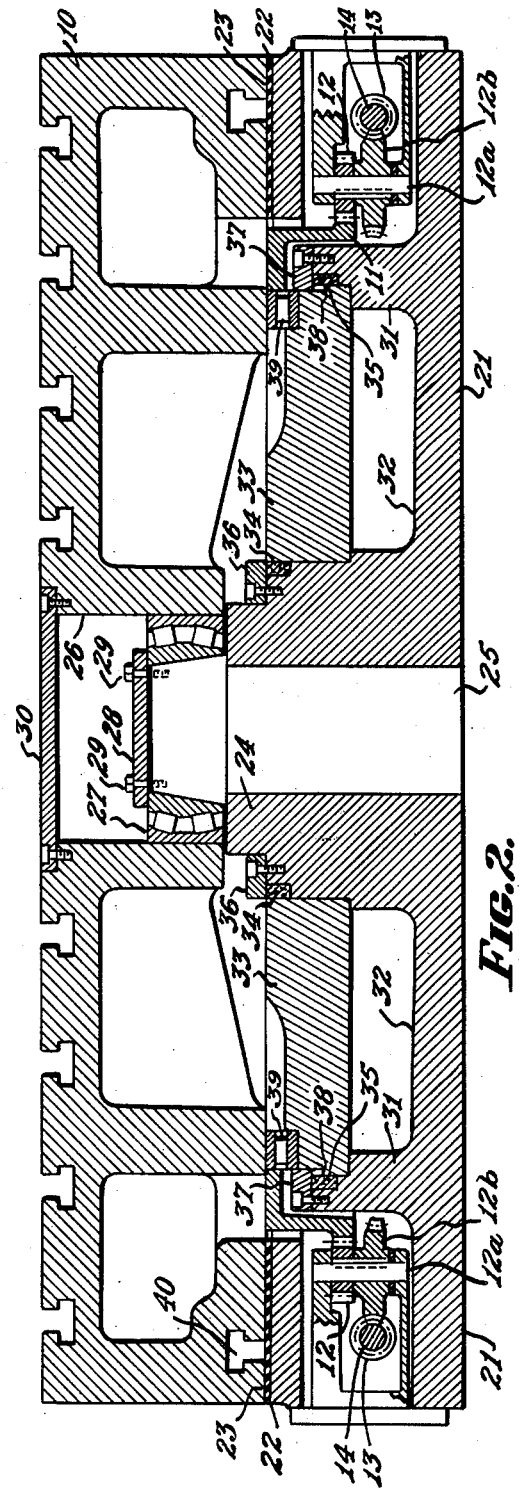
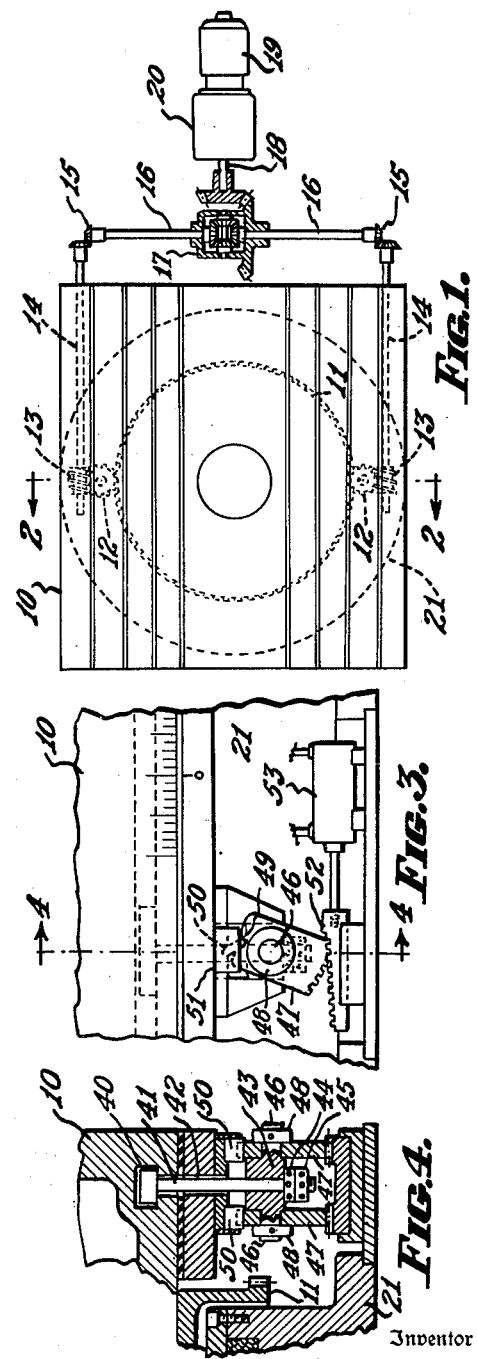
Inventor
JOHN M. WALTER,
By
Allen & Allen
Attorneys.

United States Patent Office 2,708,861
Patented May 24, 1955

2,708,861
REVOLVING TABLE FOR MACHINE TOOLS

John M. Walter, Cincinnati, Ohio, assignor to The G. A. Gray Company, Cincinnati, Ohio, a corporation of Ohio Application October 6, 1949, Serial No. 119,977

16 Claims. (Cl. 90—58)

This invention relates to revolving tables for machine tools. Such revolving tables are well known in the machine tool industry and are commonly used in connection with horizontal boring, drilling and milling machines both of the bed type and of the floor type. Basically they comprise a base and a revolving member upon said base. The revolving member may be rotated with respect to the base and indexed accurately and clamped in any desired position. The work to be machined is mounted in conventional manner on the revolving member so that after a given operation has been completed, whether it be a boring, drilling or milling operation, the revolving member may be turned or indexed to a different position as may be required for the carrying out of a succeeding machining operation. Such revolving tables have been revolved manually and by means of electric motors.

As the machine tool industry has progressed and the machine tools and castings to be machined have become larger and larger the provision of a revolving table which can be readily turned when carrying a heavy workpiece has become a greater and greater problem. Generally speaking, there is an annular slide bearing between the revolving member and the base upon which the revolving member turns with respect to the base. When such a table is used in the machining of a casting which may weigh fifty tons or more and where the machine operation with the table in a given position may take several days it has been found extremely difficult to turn the table to a different position because of the tremendous pressure on the slide bearing and because the lubricant has by that time been pretty well squeezed out from between the bearing surfaces.

With the foregoing considerations in view it is an object of the present invention to provide a revolving table of more or less conventional appearance but having certain novel features which contribute to easier turning of the revolving member with respect to the base. It is another object of my invention to provide means for facilitating the turning of the revolving member not only in connection with the drive for the revolving table but also in connection with the structure of the table itself. It is yet another object of my invention to provide in addition to the conventional annular slide bearing an auxiliary annular bearing which is normally inoperative and to provide means for bringing the auxiliary bearing into operation to relieve the load on the annular slide bearing.

In view of the fact that the weight distribution of the table, including the workpiece on the table, is generally asymmetrical so that when the revolving member is slightly raised it will tend to tilt with respect to the base, it is still another object of my invention to provide means whereby this can be accomplished without binding of the parts.

These and numerous other objects of the invention which will be apparent upon reading these specifications or which will suggest themselves to those skilled in the art, I accomplish by that certain construction and arrangement of parts of which I shall now describe an exemplary embodiment.

Reference is made to the drawings forming a part hereof and in which:

Figure 1 is a more or less schematic plan view of a revolving table showing a drive therefor.

Figure 2 is an enlarged detailed cross sectional view of the table taken on the line 2—2 of Figure 1.

Figure 3 is an elevational view of a locking arrangement for the table, and

Figure 4 is a cross sectional view of the same taken on the line 4—4 of Figure 3.

Briefly, in the practice of my invention I provide a ring gear on the revolving member, and I provide spaced pinions for driving said ring gear. The spaced pinions are driven from a common source of power preferably through a differential mechanism of conventional type. In this way equal turning moments are applied to the revolving table at diametrically opposed points so that tendency to cant the table is avoided.

Referring now in more detail to the drawings, the revolving member of the revolving table is indicated generally at 10, and, as will be seen from a consideration of the figures, it is provided with a ring gear 11. Pinions 12 are provided at diametrically opposed points in engagement with the ring gear, and the pinions 12 are keyed to the stub shafts 12a which also have keyed to them the worm wheels 12b. The worm wheels 12b are driven by the worms 13 secured to the shafts 14. The shafts 14 are driven through mitre gearing indicated generally at 15 from the two output shafts 16 of a differential indicated generally at 17. The input shaft 18 of the differential is driven by a motor 19 through a gear reducer 20. The differential 17 may be of conventional type and is not thought to require description. It will be clear that the worms 13 will have to be of the same hand so as to turn the worm wheels 12b and therefore the pinions 12 in the same direction.

Coming now to a description of the revolving table itself, it will be observed that the revolving member 10 is supported upon a base 21. The base 21 has an annular horizontal slide bearing surface which is preferably covered with formica as indicated at 22, and the revolving member 10 is provided with an annular bearing surface 23 to normally cooperate with the bearing surface 22.

The base 21 is provided with the central boss 24 which carries the stub shaft or spindle 25. The revolving member 10 has the central bore 26, and a bearing of anti-friction type is provided between the spindle or stub shaft 25 and the bore 26, as indicated generally at 27. The bearing 27 may be assembled to the spindle 25 by means of the plate 28 and bolt 29 as shown. A cover plate 30 closes the bore 26 when the mechanism has been assembled. Details of the bearing 27 will be discussed hereinafter.

The base member 21 is provided with an annular wall 31 which, together with the boss 24, provides an annular cylinder 32. An annular piston member 33 is arranged to cooperate with the cylinder 32. Suitable packing rings are provided at 34 and 35. The packing ring 34 may be held in place by means of a ring 36 as shown, while the packing ring 35 is held in position by a ring 37. It will be observed that the ring 37 extends over a shoulder 38 of the piston 33 and a slight clearance is provided between the shoulder 38 and the ring 37. This clearance is greatly exaggerated in the drawing, and actually amounts to about .020 inch.

Suitable means are provided (not shown) for conducting oil or other suitable fluid under pressure into the cylinder 32 beneath the piston 33 so that the piston can be slightly elevated until the shoulder 38 contacts the ring 37.

It will be observed that an annular roller bearing 39 is provided between the upper side of the piston 33 and the under side of the revolving member 10. This bearing normally is inoperative in that it does not carry any load when the revolving member 10 is resting on the base 21 with the bearing surfaces 22 and 23 in contact. However, when hydraulic fluid under pressure is admitted to the cylinder 32 to raise the piston 33 the bearing 39 comes into play and takes the weight of the revolving member 10 and the workpiece mounted thereon and relieves the bearing constituted by the surfaces 22 and 23 from the weight of the revolving member and any workpiece mounted thereon. When the piston 33 has been so elevated the drive heretofore described can operate easily.

In most cases the weight distribution on the revolving table will be asymmetrical because of the peculiar configurations of most workpieces. Thus, as the revolving member 10 is slightly raised there will normally be a tendency for it to cant slightly. In order to avoid binding of the parts the bearing 27 heretofore described is of the spherical type, so that a small amount of tilting of the axis of the revolving member 10 with respect to the spindle 25 will not cause any binding of the parts.

For clamping the revolving member 10 in fixed position with respect to the base 21 I have provided the arrangement best seen in Figures 3 and 4. It will be understood that there will usually be three such clamping devices disposed 120° apart, although more or fewer could be used if desired. In any event I shall describe herein only one. The under side of the revolving member 10 is provided with an annular T-slot 40 in which the T-bolts 41 are placed. These T-bolts extend through apertures 42 in the base member 21 and have secured to them the blocks 43 by means of the lock nuts 44, 45. The blocks 43 are provided with bosses or pintles 46 upon which are pivotally mounted the gear segments 47. These are held in place by means of the collars 48.

The upper surfaces of the gear segments 47 are notched as at 49 to receive the pivoted fingers 50. The fingers 50 are pivoted in notches 51 as shown.

From the foregoing it will be clear that when the gear segment 47 is rocked about the pintle 46 in a counterclockwise direction as seen in Figure 3 a toggle action will be exerted by the finger 50 upon the notch 49 to urge the gear segments 47 and the pintle 46 downwardly. From Figure 4 it will be clear that downward movement of the block 43 produces a clamping action of the bolt 41.

The gear segment 47 is rocked by means of a rack 52 operated by a suitable fluid cylinder 53. It will be observed that the teeth of the rack 52 are disposed on a slight angle to accommodate the clamping movement of the pintles 46 downwardly.

It will be clear that numerous modifications may be made without departing from the spirit of my invention and that the specific details set down herein are given by way of example only. Having now fully described my invention, what I claim as new and desire to secure by Letters Patent is:

1. An indexing table for machine tools, comprising a base, an indexing member, means supporting said member on said base, a normally inoperative annular thrust bearing between said base and member, a spherical spindle bearing between said base and member, and means for rendering said thrust bearing operative to relieve said supporting means of the weight of said member, said spherical spindle bearing permitting a slight tilting of said member relative to said base in case of asymmetrical weight distribution on said indexing member.

2. An indexing table for machine tools, comprising a base, an indexing member, means supporting said member on said base, a normally inoperative annular thrust bearing between said base and member, a spherical spindle bearing between said base and member, means for rendering said thrust bearing operative to relieve said supporting means of the weight of said member, said spherical spindle bearing permitting a slight tilting of said member relative to said base in case of asymmetrical weight distribution on said indexing member, and means for clamping said indexing member to said base in any indexed position.

3. An indexing table for machine tools, comprising a base, an indexing member, means supporting said member on said base, an annular antifriction bearing between said base and member, said antifriction bearing being normally inoperative, a spherical spindle bearing between said base and member, and means for rendering said antifriction bearing operative to relieve said supporting means of the weight of said member, said spherical spindle bearing permitting a slight tilting of said member relative to said base in case of asymmetrical weight distribution on said indexing member.

4. An indexing table for machine tools, comprising a base, an indexing member, means supporting said member on said base, an annular antifriction bearing between said base and member, said antifriction bearing being normally inoperative, a spherical spindle bearing between said base and member, means for rendering said antifriction bearing operative to relieve said supporting means of the weight of said member, said spherical spindle bearing permitting a slight tilting of said member relative to said base in case of asymmetrical weight distribution on said indexing member, and means for clamping said indexing member to said base in any indexed position.

5. An indexing table for machine tools, comprising a base, an indexing member, means supporting said member on said base, a spherical spindle bearing between said base and member, a hydraulic cylinder in said base, a piston in said cylinder, and an annular bearing between said piston and member, said piston being movable to lift said member on said annular bearing to relieve said supporting means of the weight of said member, said spherical spindle bearing permitting a slight tilting of said member relative to said base in case of asymmetrical weight distribution on said indexing member.

6. An indexing table for machine tools, comprising a base, an indexing member, means supporting said member on said base, a spherical spindle bearing between said base and member, a hydraulic cylinder in said base, a piston in said cylinder, an annular bearing between said piston and member, said piston being movable to lift said member on said annular bearing to relieve said supporting means of the weight of said member, said spherical spindle bearing permitting a slight tilting of said member relative to said base in case of asymmetrical weight distribution on said indexing member, and means for clamping said indexing member to said base in any indexed position.

7. An indexing table for machine tools, comprising a base, an indexing member, means supporting said member on said base, a spherical spindle bearing between said base and member, a hydraulic cylinder in said base, a piston in said cylinder, and an annular bearing between said piston and member, said piston being movable to lift said member on said annular bearing to relieve said supporting means of the weight of said member, means limiting the travel of said piston, said spherical spindle bearing permitting a slight tilting of said member relative to said base in case of asymmetrical weight distribution on said indexing member.

8. An indexing table for machine tools, comprising a base having an annular horizontal supporting surface, a central boss in said base carrying a vertical stud, an indexing member having an annular horizontal surface to cooperate with the horizontal annular supporting surface on said base, and having a central bore, a spherical antifriction bearing between said stud and said bore, an annular wall in said base defining, between it and said central stud, an annular cylinder, an annular piston in said annular cylinder, an annular bearing race on said annular piston, an annular bearing race on said indexing member, an antifriction means therebetween, the bearing constituted by said annular races being normally inoperative, and means for applying hydraulic pressure to the under side of said annular piston to cause said bearing constituted by said annular races to become operative and to lift said indexing member slightly to take the weight of said indexing member off said annular horizontal supporting surface, said spherical spindle bearing permitting a slight tilting of said member relative to said base in case of asymmetrical weight distribution on said indexing member.

9. An indexing table for machine tools, comprising a base having an annular horizontal supporting surface, a central boss in said base carrying a vertical stud, an indexing member having an annular horizontal surface to cooperate with the horizontal annular supporting surface on said base, and having a central bore, a spherical antifriction bearing between said stud and said bore, an annular wall in said base defining, between it and said central stud, an annular cylinder, an annular piston in said annular cylinder, an annular bearing race on said annular piston, an annular bearing race on said indexing member, an antifriction means therebetween, the bearing constituted by said annular races being normally inoperative, and means for clamping said indexing member to said base in any indexed position.

10. An indexing table for machine tools, comprising a base having an annular horizontal supporting surface, a central boss in said base carrying a vertical stud, an indexing member having an annular horizontal surface to cooperate with the horizontal annular supporting surface on said base, and having a central bore, a spherical antifriction bearing between said stud and said bore, an annular wall in said base defining, between it and said central stud, an annular cylinder, an annular piston in said annular cylinder, an annular bearing race on said annular piston, an annular bearing race on said indexing member, an antifriction means therebetween, the bearing constituted by said annular races being normally inoperative, and means for applying hydraulic pressure to the under side of said annular piston to cause said bearing constituted by said annular races to become operative and to lift said indexing member slightly to take the weight of said indexing member off said annular horizontal supporting surface, means limiting the travel of said piston, said spherical spindle bearing permitting a slight tilting of said member relative to said base in case of asymmetrical weight distribution on said indexing member.

11. An indexing table for machine tools, comprising a base, an indexing member, means supporting said member on said base, a spherical spindle bearing between said base and member, a hydraulic cylinder in said base, a piston in said cylinder, an annular bearing between said piston and member, said piston being movable to lift said member on said annular bearing to relieve said supporting means of the weight of said member, said spherical spindle bearing permitting a slight tilting of said member relative to said base in case of asymmetrical weight distribution of said indexing member, power means for indexing said member, and operative connections from said power means to apply said power to said indexing member at two diametrically spaced points on said indexing member.

12. An indexing table for machine tools, comprising a base, an indexing member, means supporting said member on said base, a spherical spindle bearing between said base and member, a hydraulic cylinder in said base, a piston in said cylinder, an annular bearing between said piston and member, said piston being movable to lift said member on said annular bearing to relieve said supporting means of the weight of said member, said spherical spindle bearing permitting a slight tilting of said member relative to said base in case of asymmetrical weight distribution of said indexing member, a differential operatively connected to said power means, and operative connections from said differential to two diametrically spaced points on said indexing member.

13. An indexing table for machine tools, comprising a base, an indexing member, means supporting said member on said base, a spherical spindle bearing between said base and member, a hydraulic cylinder in said base, a piston in said cylinder, an annular bearing between said piston and member, said piston being movable to lift said member on said annular bearing to relieve said supporting means of the weight of said member, said spherical spindle bearing permitting a slight tilting of said member relative to said base in case of asymmetrical weight distribution of said indexing member, power means for indexing said member, and means for clamping said indexing member to said base in any indexed position.

14. An indexing table for machine tools, comprising a base, an indexing member, means supporting said member on said base, a spherical spindle bearing between said base and member, a hydraulic cylinder in said base, a piston in said cylinder, an annular bearing between said piston and member, said piston being movable to lift said member on said annular bearing to relieve said supporting means of the weight of said member, means limiting the travel of said piston, said spherical spindle bearing permitting a slight tilting of said member relative to said base in case of asymmetrical weight distribution of said indexing member, power means for indexing said member, and operative connections from said power means to apply said power to said indexing member at two diametrically spaced points on said indexing member.

15. An indexing table for machine tools, comprising a base, an indexing member, a first bearing between said base and member for supporting said member on said base, a normally inoperative auxiliary annular thrust bearing between said base and member, a spherical spindle bearing between said base and member, and means for rendering said auxiliary bearing operative to relieve said first bearing of the weight of said member, said spherical spindle bearing permitting a slight tilting of said member relative to said base in case of asymmetrical weight distribution on said indexing member.

16. An indexing table for machine tools, comprising a base, and an indexing member supported on said base, a first annular bearing between said base and member, a spherical spindle bearing between said base and member, a hydraulic cylinder in said base, a piston in said cylinder, and an auxiliary annular bearing between said piston and member, said piston being movable to lift said member on said auxiliary bearing to relieve said first bearing of the weight of said member, said spherical spindle bearing permitting a slight tilting of said member relative to said base in case of asymmetrical weight distribution on said indexing member.

References Cited in the file of this patent

UNITED STATES PATENTS

| | | |
|---|---|---|
| 1,199,601 | Parsons et al. | Sept. 26, 1919 |
| 1,384,558 | Evans | July 12, 1921 |
| 1,997,916 | Rusnak | Apr. 16, 1935 |
| 2,145,355 | Jereczek | Jan. 31, 1939 |
| 2,155,680 | Pfauter | Apr. 25, 1939 |
| 2,380,873 | Schofer et al. | July 31, 1945 |

FOREIGN PATENTS

| | | |
|---|---|---|
| 14,691 | Great Britain | Mar. 26, 1914 |
| 101,292 | Great Britain | May 10, 1917 |
| 465,389 | France | Feb. 5, 1914 |